United States Patent
Higdon et al.

[11] Patent Number: 6,148,183
[45] Date of Patent: Nov. 14, 2000

[54] SWITCH ASSEMBLY FOR AN ELECTRONIC DEVICE

[75] Inventors: Philip S. Higdon, Schaumburg; James Barber, Mundelein, both of Ill.

[73] Assignee: Motorola, Inc., Schaumburg, Ill.

[21] Appl. No.: 09/001,891

[22] Filed: Dec. 31, 1997

[51] Int. Cl.[7] .............................. H04B 1/38; H01H 13/70
[52] U.S. Cl. ........................... 455/90; 455/550; 455/575; 200/343; 200/5 R; 379/422
[58] Field of Search .............................. 455/90, 550, 575; 379/369, 422, 424, 427, 428, 370; 200/5 R, 343; 345/168, 169; 361/680

[56] References Cited

U.S. PATENT DOCUMENTS

| | | | |
|---|---|---|---|
| 4,536,628 | 8/1985 | Willhaus | 200/336 |
| 4,654,488 | 3/1987 | Westfall | 200/5 |
| 4,972,051 | 11/1990 | Hodsdon | 200/5 |
| 5,151,946 | 9/1992 | Martensson | 455/550 |
| 5,692,044 | 11/1997 | Hughes et al. | 379/422 |
| 5,749,457 | 5/1998 | Castaneda et al. | 200/343 |
| 5,923,007 | 7/1999 | Emmert | 200/5 R |

OTHER PUBLICATIONS

Emmert, Steven C., U.S.S.N. 08/950,637, "High Density Flexible Circuit Element and Communication Device Using Same", Atty. Docket No. CE01693R, filed Oct. 15, 1997.

*Primary Examiner*—William G. Trost
*Assistant Examiner*—Erika A. Gary
*Attorney, Agent, or Firm*—Mark D. Patrick; Hisashi D. Watanabe

[57] ABSTRACT

An electronic device (100) includes a housing (104), a substrate (257) seated in the housing (104), and a switch assembly (122) positioned in the housing (104). The switch assembly (122) has a body (200), contact pads (204), and contact arms (202). The contact pads (204) are carried on the substrate (257) and the contact arms (202) are carried on the body (200). The contact arms (202) abut the contact pads (204) and are deflected thereby. Such abutment electrically connects the switch assembly (122) to the substrate (257) without soldering.

1 Claim, 7 Drawing Sheets

SWITCH ASSEMBLY FOR AN ELECTRONIC DEVICE

FIELD OF THE INVENTION

The present invention relates generally to an electronic device and, more particularly, to an electronic device employing a switch assembly.

BACKGROUND OF THE INVENTION

Electronic devices, such as wireless communication devices, have, in recent years, undergone significant reductions in size and, thus, have become easier to transport and use in a variety of environments. One such device is a radiotelephone having a user interface comprising a display, conventional telephone keys (0–9, *, #), and conventional function keys (RCL, STO, PWR, CLR, SND, END, FCN), all of which are mounted to a substrate, such as a circuit board, disposed in the radiotelephone and accessible via a front surface of the radiotelephone. To operate the radiotelephone, a user must typically use two hands—one hand to hold the device and the other hand to actuate the keys. To facilitate one-handed operation of frequently used features of the radiotelephone, it is known to mount a button arrangement next to the display so that it is accessible via a side surface of the radiotelephone. The button arrangement is a switch assembly that is actuated by the index finger or thumb of the hand holding the device. Examples of such a switch assembly is shown and described in U.S. patent application Ser. No. 08/950,955 by Emmert, entitled "Switch Assembly Including Rocker Switch With Integrated Center Selector Switch," filed Oct. 15, 1997, and assigned to Motorola, Inc.

During operation of the radiotelephone, a user retrieves visual information from the display. Such information may include, but is not limited to, electronic phone book entries, caller identification information, e-mail messages, short messaging information, and Internet website information. To adequately support viewing of such information, particularly that employing multiple lines of text, it is desirable to maximize the area of the display. However, in miniaturized, low profile radiotelephones where the switch assembly is soldered on the circuit board next to the display and occupies circuit board surface area, display size cannot be maximized.

Thus, what is needed is a switch assembly that minimizes use of circuit board surface area without adding increased complexity during assembly.

DETAILED DESCRIPTION OF THE PREFERRED EMBODIMENTS

An electronic device includes a housing, a substrate seated in the housing, and a switch assembly positioned in the housing. The switch assembly has a body, first and second contact pads, and first and second contact arms. The first and second contact pads are carried on the substrate and the first and second contact arms are carried on the body. The first and second contact arms abut corresponding ones of the first and second contact pads and are deflected thereby. Such abutment electrically connects the switch assembly to the substrate. Because only the first and second contact pads are carried on the substrate, the switch assembly occupies only minimal substrate area. Also, because an electrical connection can be accomplished via abutment, and without soldering, assembly complexity is minimized.

Figure 1:
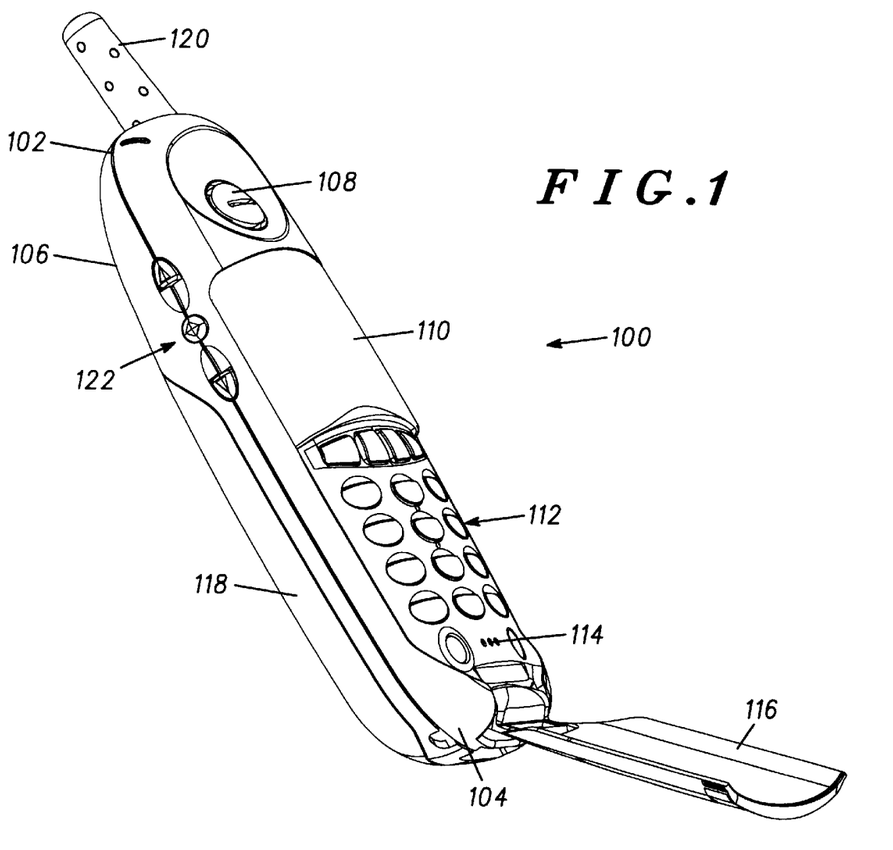
FIG. 1 is a perspective view of an electronic device employing a switch assembly.

An electronic device 100, which is shown in FIG. 1 to be a wireless communication device such as a radiotelephone, has a housing 102 that includes front and rear housing portions 104 and 106. The front housing portion 104 includes a earpiece 108 for emitting audible sounds, a display area 110 for viewing information, a keypad 112 for entering or accessing information, a microphone 114 for receiving audible sounds, and a keypad cover 116. The keypad cover 116 is rotatable between the opened position shown in FIG. 1 and a closed position in which the keypad cover 116 covers the keypad 112 and microphone 114 and extends co-planarly with the display area 110. The rear housing portion 106 has a battery 118 for providing power to the electronic device 100 and an antenna 120 for receiving and emitting signals to effectuate voice and data communications between the electronic device 100 and a remote device, such as another radiotelephone, a base station, or the like. A button arrangement or switch assembly 122 for executing functions of the electronic device 100, such as menu scrolling and earpiece volume adjustment, is carried on a side of the housing 102 where the front and rear housing portions 104 and 106 meet. In operation, a user typically holds the electronic device 100 such that the switch assembly 122 is readily actuatable by a finger or thumb.

Figure 2:
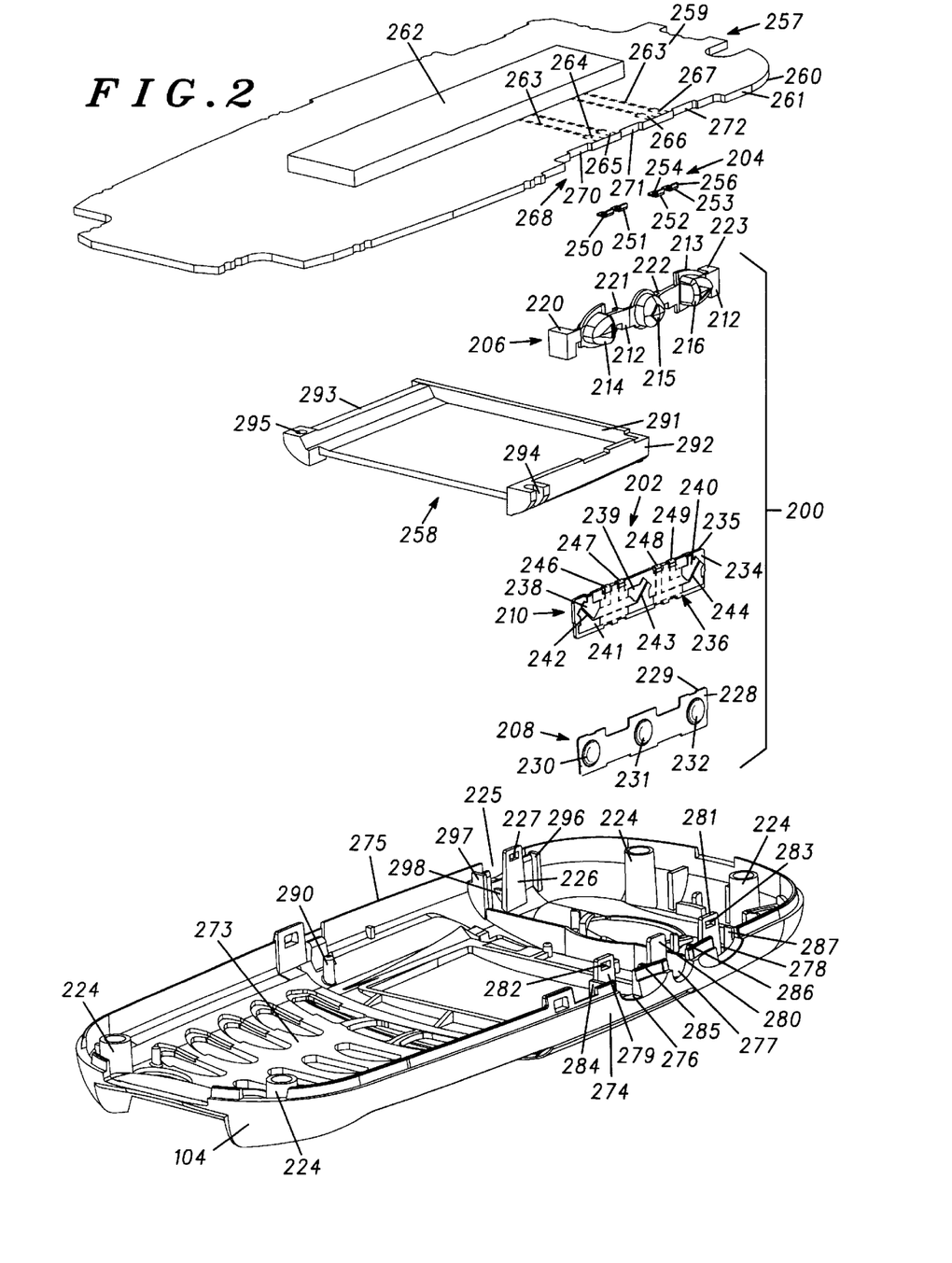
FIG. 2 is an exploded first perspective view of a fragmentary portion of the electronic device, showing the switch assembly, a housing portion, a substrate, and a display.
Figure 3:
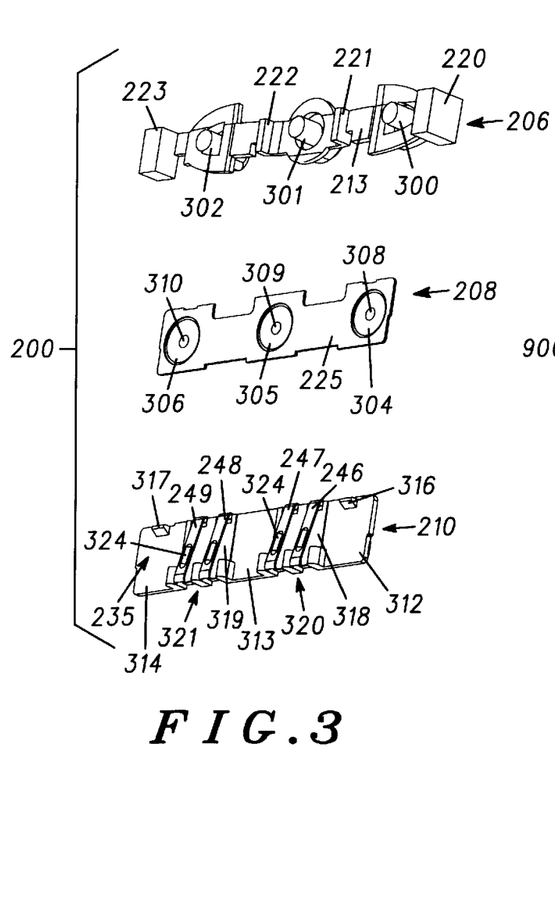
FIG. 3 is an exploded second perspective view of the switch assembly.

In FIGS. 2 and 3, the switch assembly 122 is shown to be made up of a body 200, a set of contact arms 202, and a set of contact pads 204. The body 200 includes an actuator subassembly 206, a dome subassembly 208, and a circuit panel assembly 210, which are shown disassembled in FIGS. 2 and 3. The actuator subassembly 206 has opposing front and rear face surfaces 212 and 213. Front face surface 212 has convex, raised left, middle, and right actuators 214, 215, and 216 carried thereon. Rear face surface 213 has raised grips 220, 221, 222, and 223 carried thereon. Grips 220 and 223 are located at left and right ends of rear face surface 213. Grips 221 and 222 are positioned between grips 220 and 223 and substantially equidistant from grips 220 and 223, respectively. Plungers 300, 301, and 302 are formed between grips 220 and 221, grips 221 and 222, and grips 222 and 223, respectively, and are carried in recessed, concave surfaces of rear face surface 213 formed by actuators 214, 215, and 216, respectively. The plungers 300–302 are generally cylindrical and are dimensioned such that distal ends thereof reside outside of the recessed surfaces. The actuator subassembly 206 is integrally molded from silicon or other suitable material.

The dome subassembly 208 is generally rectangular with opposing front and rear face surfaces 228 and 229. Front face surface 228 is defined by convex, raised left, middle, and right domes 230, 231, and 232 carried thereon. Rear face surface is defined by recessed, concave surfaces 304, 305, and 306 formed by the domes 230–232, respectively. Conductive pads 308, 309, and 310 are carried on the concave surfaces 304–306, respectively, opposite the apex of the domes 230–232. The dome subassembly 208 is formed from a thin sheet of polyester or other suitable material. The conductive pads 308–310 are formed from metallic ink deposited on the concave surfaces 304–306 using a screening process or other depositing technique.

The circuit panel subassembly 210 is generally rectangular with opposing front and rear face surfaces 234 and 235. Front face surface 234 is defined by a circuit 236. The circuit 236 is made up of conductors 238, 239, 240, and 241. Portions of the conductors 238–241 are disposed between the front and rear face surfaces 234 and 235 and are shown in broken line. The conductors 238–240 are electrically isolated from one another and from conductor 241 by left, middle, and right open circuit areas 242, 243, and 244, respectively, which are carried on front face surface 234 and visible in FIG. 2. Substantially flat mating areas 312, 313, and 314 define the rear face surface 235 opposite to the open circuit areas 242–244, respectively. Mating areas 312 and 314 include corresponding captivating ribs 316 and 317 positioned near a top edge of the circuit panel subassembly 210. Contact areas 318 and 319 are formed on rear face surface 235 between mating areas 312 and 313 and mating areas 313 and 314, respectively. The contact areas 318 and 319 include corresponding sets of locator feet 320 and 321 positioned near a bottom edge of the circuit panel subassembly 210. The circuit panel subassembly 210 is molded from polycarbonate or other suitable material. The circuit 236 is stamped from a thin sheet of phosphor bronze or other material and attached to the circuit panel subassembly 210 using insert molding, ultrasonic welding, or other attachment technique.

The set of contact arms 202, which specifically include arms 246, 247, 248, and 249, are coupled to a top edge of the circuit panel subassembly 210 of the body 200 and positioned to extend transversely across the contact areas 318 and 319 of rear face surface 235 of the circuit panel subassembly 210. At the top edge, the arms 246, 247, 248, and 249 are electrically connected to conductors 238, 239, 241, and 240, respectively, and defined by an elbow that extends up and around the top edge. The contact arms 246–249 extend from the top edge at an angle, such as 15 degrees with respect to the contact areas 318 and 319, such that distal ends of the contact arms 246–249 are positioned between, but outside of, corresponding locator feet 320 and 321. Each of one of the contact arms 246–249 includes an integral crown 324 to direct and ensure accurate contact. Each of the contact arms 246–249 is movable between a rest position, shown in FIG. 3, and a deflected position, shown in FIG. 6 and further described below. Each of the contact arms 246–249 are stamped from a thin sheet of phosphor bronze or other suitable material and bent into an unbalanced "V"-shaped configuration. The unbalanced leg of each of the contacts arms 246–249 is integrally formed with conductors 238, 239, 241, and 240, respectively, which are secured between front and rear face surfaces 234 and 235 of the circuit panel subassembly 210.

The set of contact pads 204 specifically include pads 250, 251, 252, and 253. The pads 250–253 are substantially "L"-shaped. A top side of each of the pads 250–253 forms a faying surface 254 suitable for substrate surface mount attachment. A front face surface of each of the pads 250–253 forms a mating surface 256. The pads 250–253 are stamped from a thin sheet of brass or other suitable material and bent into the "L"-shaped configuration.

The switch assembly 122 is assembled in conjunction with other components of the electronic device 100 of FIG. 1, which include a substrate 257 of FIG. 2, the front housing portion 104, and a display 258. The substrate 257 has top and bottom surfaces 259 and 260 and an edge surface 261 extending therebetween. Radio circuitry 262 is disposed on top surface 259. Traces 263 disposed in the substrate 257 electrically connect the radio circuitry 262 to faying surfaces 264, 265, 266, and 267. The faying surfaces 264–267 are disposed on bottom surface 260 adjacent to a recessed area 268 of edge surface 261. The recessed area 268 is defined by spaced notches 270, 271, and 272. Faying surfaces 264 and 265 are positioned between notches 270 and 271 and faying surfaces 266 and 267 are positioned between notches 271 and 272. The substrate 257 is fabricated from printed circuit board material, such as polyimide and flame retardant industrial fiberglass, or other suitable material.

Figure 4:
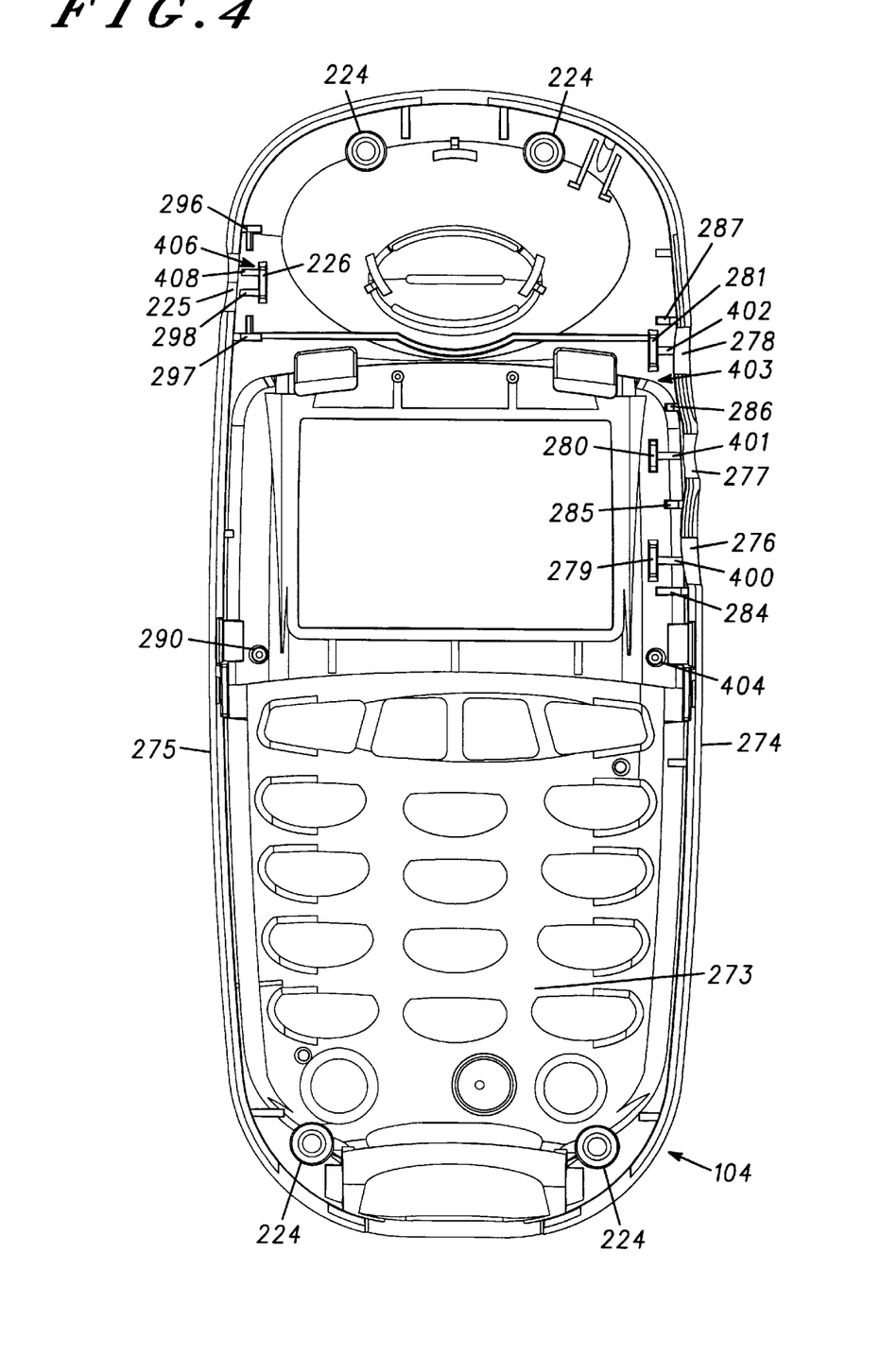
FIG. 4 is a plan view of the housing portion.

The front housing portion 104, which is shown in FIGS. 2 and 4, has an internal face surface 273 and left and right sidewalls 274 and 275 extending substantially perpendicularly from the internal face surface 273 at respective left and right edges thereof. A top edge of left sidewall 274 is defined by left, middle, and right apertures 276, 277, and 278. Left, middle, and right support ribs 279, 280, and 281, which extend substantially perpendicularly from internal face surface 273 and substantially parallelly to left sidewall 274, are aligned with the apertures 276–278, respectively. Support ribs 279 and 281 have respective retention slots 282 and 283 adjacent to top edges thereof. Positioning rails 284, 285, 286, and 287, which extend substantially perpendicularly from both internal face surface 273 and left sidewall 274, reside between the support ribs 279–281 and left sidewall 274. Left, middle, and right arms 400, 401, and 402 extend substantially perpendicularly from left sidewall 274 beneath respective ones of the apertures 276–278 to bottom edges of respective ones of the support ribs 279–281. Left sidewall 274, the support ribs 279–281, positioning rails 284 and 287, and the arms 400–402 substantially define width, length, and depth boundaries of a pocket 403 for the switch assembly 122. In the illustrated embodiment, the pocket 403 has a width of approximately 3 mm, a length of approximately 30 mm, and a depth of approximately 10 mm. Internal face surface 273 also has posts 290 and 404 for positioning the display 258 and bosses 224 for securing the rear housing portion 106 of FIG. 1 to the front housing portion 104. The front housing portion 104 is molded from polycarbonate or other suitable material and dimensioned such that internal face surface 273 of FIG. 2, in the illustrated embodiment, has a length and of approximately 125 mm and a width of approximately 50 mm.

The display 258, which is shown in FIG. 2, is housed in a rigid rectangular frame 291 with left and right sidewalls 292 and 293. Sidewalls 292 and 293 include corresponding positioning slots 294 and 295. The display 258 is a liquid crystal display or other suitable display type. The frame 291 is molded from polycarbonate or other suitable material and, in the illustrated embodiment, has an approximate length of 30 mm and an approximate width of 45 mm.

The switch assembly 122, the substrate 257, the front housing portion 104, and the display 258 are assembled in the following manner and in conjunction with FIGS. 2–4. Initially, the dome subassembly 208 of the body 200 is assembled to the circuit panel subassembly 210 of the body 200. Rear face surface 229 of the dome subassembly 208 is juxtaposed with front face surface 234 of the circuit panel subassembly 210 such that the concave surfaces 304–306 opposite the domes 230–232 align with the open circuit areas 242–244, respectively. The dome subassembly 208 is secured to the circuit panel subassembly 210 using a commercially available pressure sensitive adhesive, or other suitable attachment technique.

Next, the set of contact pads 202 is assembled to the substrate 257. Faying surface 254 of each one of the contact pads 250–253 is juxtaposed with the faying surfaces 264–267, respectively, such that the contact pads 250–253 reside on bottom and edge surfaces 260 and 261 of the substrate 257. Once positioned, the contact pads 250–253 are carried on the substrate 257 such that mating surface 256 of contact pads 250 and 251 faces outward from the recessed area 268 of edge surface 261 between notches 270 and 271 and mating surface 256 of contact pads 252 and 253 faces outward from the recessed area 268 of edge surface 261 between notches 271 and 272. The contact pads 250–253 are attached to the faying surfaces 264–267 using an automated process of screen printing solder paste onto the faying surfaces 264–267, placing the contact pads 250–253 into engagement with the solder paste on the faying surfaces 264–267, and reflow heating the substrate 257 to melt the solder paste and physically and electrically bond the contact pads 250–253 to the faying surfaces 264–267. Alternatively, the contact pads 250–253 may be assembled by other automated process, such as waveline soldering, or by hand.

The actuator subassembly 206 is then assembled to the front housing portion 104. The actuator subassembly 206 is positioned above the pocket 403 of the front housing portion 104 such that the actuators 214–216 are in vertical alignment with the apertures 276–278, respectively, such as shown in FIG. 2. The actuator subassembly 206 is lowered into engagement with the pocket 403 such that the actuators 214–216 insert into the apertures 276–278 of the front housing portion 104 and the actuator subassembly 206 is captured by the positioning rails 284–287, whereby front face surface 212 of the actuator subassembly 206 juxtaposes left sidewall 274 of the front housing portion 104 and rear face surface 213 of the actuator subassembly 206 abuts the positioning rails 284–287. The actuator subassembly 206 is held in assemblage by the grips 220–223 of actuator subassembly 206, which engage the positioning rails 284–287, respectively.

Next, the circuit board subassembly 208 with the dome subassembly 206 attached thereto is assembled to the pocket 403 of the front housing portion 104. The circuit board subassembly 208/dome subassembly 206 is slid vertically downward in the pocket 403 between the actuator subassembly 206 and the support ribs 279–281 of the front housing portion 104 and between the positioning rails 284 and 287 such that front face surface 228 of the dome subassembly 206 faces rear face surface 213 of the actuator subassembly 206 and abuts positioning rails 285 and 286; the mating areas 312–314 of rear face surface 235 of the circuit board subassembly 208 juxtapose the support ribs 279–281; locator feet 320 of contact area 318 reside between support ribs 279 and 280; and locator feet 321 of contact area 319 reside between support ribs 280 and 281. The circuit board subassembly 208/dome subassembly 206 is slid until a bottom edge of the circuit board subassembly 208 abuts the arms 400–402 of the front housing portion 104; the plungers 300–301 of the actuator subassembly 206 abut the domes 230–232 of the dome subassembly 208, respectively; and the captivating ribs 316 and 317 of mating areas 312 and 314 of the circuit panel subassembly 210 insert into the retention slots 282 and 283 of support ribs 279 and 281 of the front housing portion 104, respectively. Once the captivating ribs 316 and 317 engage the retention slots 282 and 283, the circuit board subassembly 208/dome subassembly 206 is locked in the pocket 403. The circuit board subassembly 208/dome subassembly 206 is released by deflecting the circuit board subassembly 208/dome subassembly 206 away from the support ribs 279 and 281 until ribs 316 and 317 are removed from slots 282 and 283 and lifting the circuit board subassembly 208/dome subassembly 206 away from the pocket 403.

The display 258 is assembled to the front housing portion 104. The display 258 is vertically lowered into juxtaposition with internal face surface 273 such that posts 404 and 290 insert into slots 294 and 295, respectively.

Next, the substrate 257 is assembled to the front housing portion 104. The substrate 257 is positioned above the front housing portion 104 such that the recessed area 268 is in vertical alignment with the pocket 403. The substrate 257 is lowered between bosses 224 and seated in front housing portion 104 so as to juxtapose the display 258. As the substrate 257 is lowered, the support ribs 279–281 of the pocket 403 align with the notches 270–272 of the recessed area 268 and the contact pads 250–253 engage and deflect the contact arms 246–249, respectively, towards the contact areas 318 and 319 of rear face surface 235 of the circuit panel subassembly 210. This completes assembly of the switch assembly 122. The aforementioned method of assembly of the switch assembly 122 is desirable because each of the substrate 257, the display 258, and the body 200 are easily assembled to the front housing portion 104 via movement in a single, vertically downward direction and without soldering. Such assembly is often referred to as z-axis assembly and is conducive to automated assembly techniques.

Figure 5:
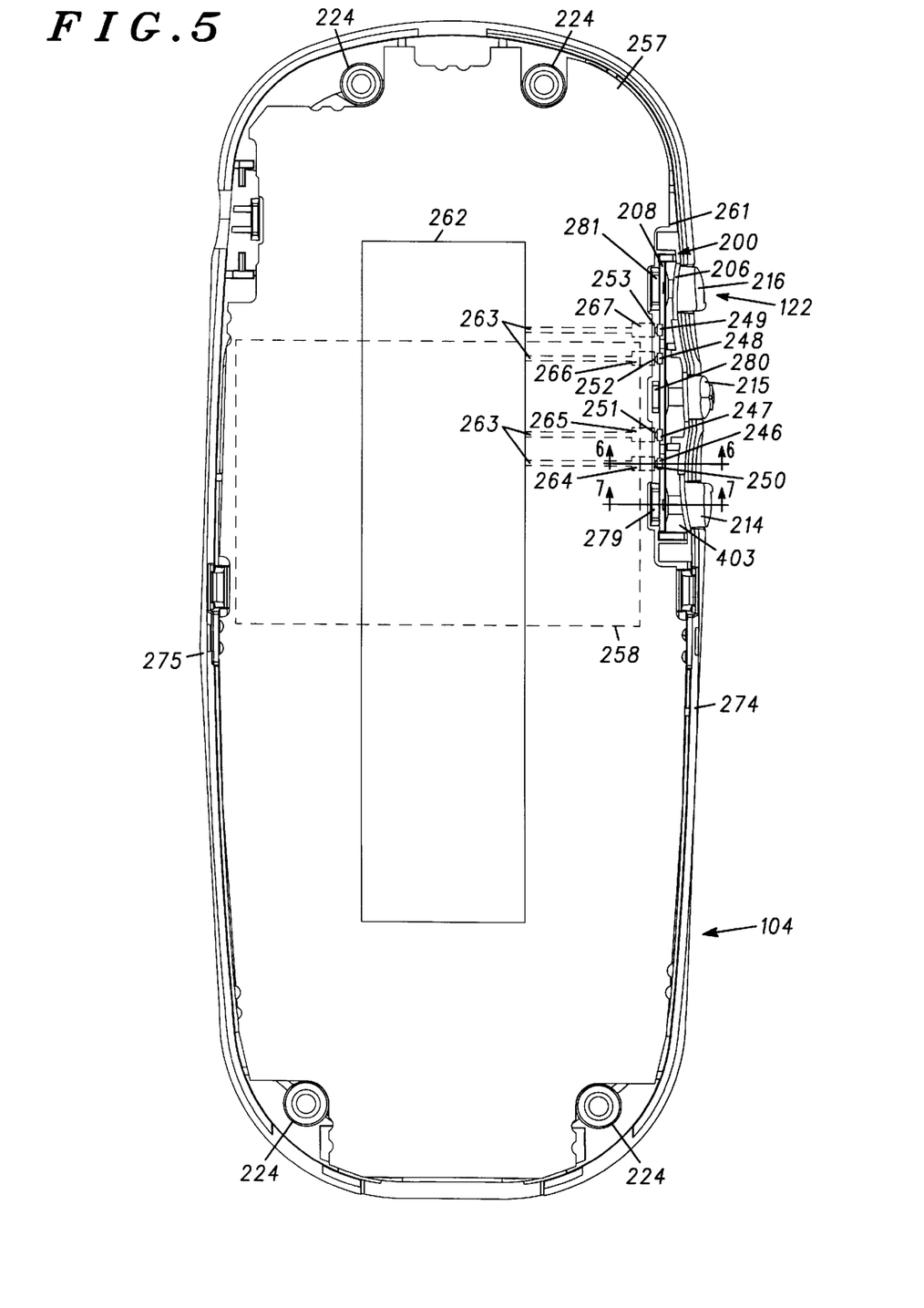
FIG. 5 is a plan view of the fragmentary portion of the electronic device, showing the switch assembly assembled to the housing portion and the substrate.
Figure 6:
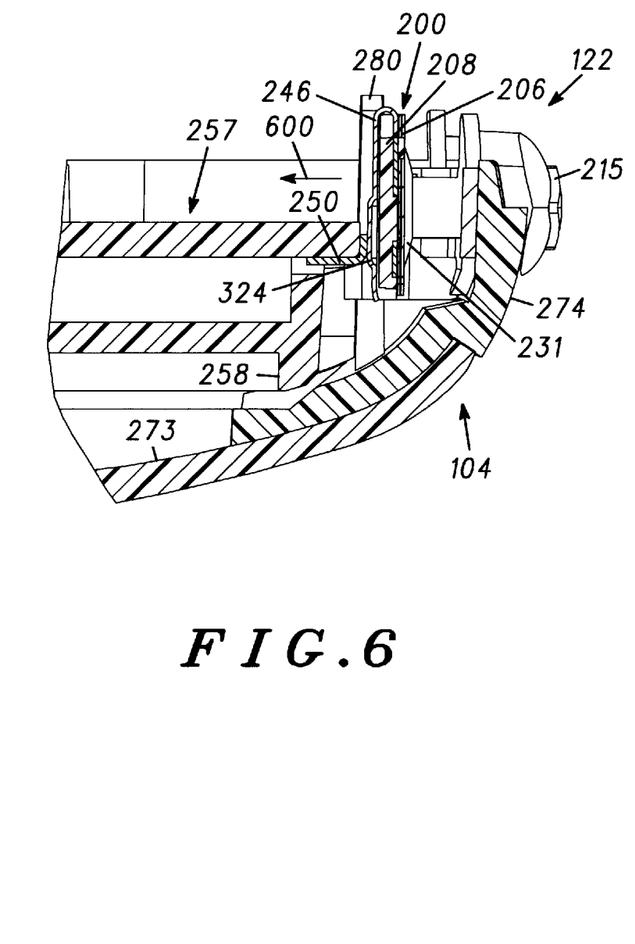
FIG. 6 is a first partial cross-sectional view of the fragmentary portion of the electronic device taken across section lines 6—6 of FIG. 5.

The switch assembly 122, the substrate 257, the display 258 (the footprint of which being depicted in broken line for illustrative purposes), and the front housing portion 104 are shown assembled in FIG. 5. In assemblage, the body 200 of the switch assembly 122 is substantially perpendicular to the substrate 257. The contact arms 246–249 deflect to abut the contact pads 250–253, as shown in FIG. 6 with respect to contact arm 246 and contact pad 250. In the deflected position, contact arm 246 is substantially vertical and parallel to the body 200. A torsional force exhibited at the elbow of contact arm 246 is translated by contact arm 246 to the crown 324, which exerts a force on contact pad 250 in a direction defined by arrow 600 and, thereby, maintains abutment with contact pad 250. Upon removal of the substrate 257 from the front housing portion 104, the torsional force exhibited at the elbow of contact arm 246 rotates contact arm 246 away from the body 200 to the rest position shown in FIG. 3.

Figure 7:
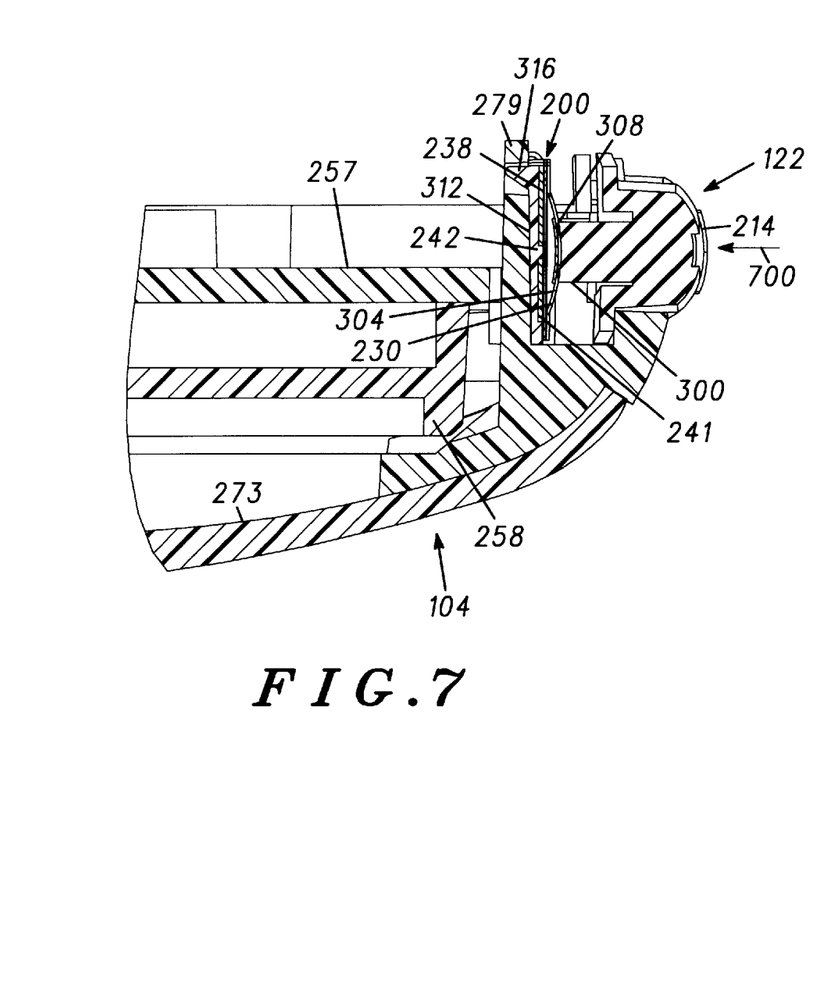
FIG. 7 is a second partial cross-sectional view of the fragmentary portion of the electronic device taken across section lines 7—7 of FIG. 5.

The switch assembly 122 is actuated by exerting a force on one of the actuators 214–216, such as actuator 214 shown in FIG. 7, in the direction of arrow 700. The force moves actuator 214 in the direction of the arrow 700 and causes plunger 300 to collapse dome 230. Conductive pad 308 carried on concave surface 304 behind dome 230, engages open circuit area 242 and electrically connects conductors 238 and 241. A signal indicating connection of the conductors 238 and 241 is transferred to radio circuitry 262 of FIG. 5 via a conduction path of contact arm 246, contact pad 250, and trace 263. As shown in FIGS. 5 and 7, support rib 279 is in direct alignment with actuator 214 and prevents the body 200 from moving in the direction of arrow 700 when the force is applied to actuator 214. Because the body 200 is supported and the contact arms 246–249 are offset in alignment with the actuators 214–216, as best shown in FIG. 5, no further deflection or deformation of the contact arms 246–249 results upon actuation of the actuators 214–216.

Although the contact arms 246–249 and the contact pads 250–253 are depicted as being carried on the body 200 and the substrate 257, respectively, one will recognize that the contact arms 246–249 could alternately be carried on the substrate 257 and the contact pads 250–253 could alternately be carried on the body 200. In such an alternate arrangement, the substrate 257 would be assembled to the front housing portion 104 prior to positioning of the body 200 in the pocket 403. This would allow the contact pads carried the body 200 to deflect the contact arms, which would be attached to the bottom surface 260 of the substrate 257 and carried on the edge surface 261 of the substrate 257, towards the substrate 257.

Because the switch assembly 122 is dimensionally constrained in width and the contact pads 250–253 are low enough in profile to not take up surface area of the substrate 257 needed for the display 258 (e.g., note overlap of the display 258 and contact pad 250 in FIG. 6), the width of the display 258 can be maximized without relocating the switch assembly 122 from its position adjacent to the display 258. During operation of the electronic device 100 of FIG. 1, the display 258 graphically depicts functions associated with actuation of the switch assembly 122, such as, for example, menu scrolling or soft key selection. By positioning the display 258 close to the actuators 214–216, the user can visually associate the functions with particular ones of the actuators 214–216. For example, a depiction of graphical up, select, and down arrows along a left edge of the display 258, creates a strong intuitive visual link between actuator 216 and the up arrow, actuator 215 and the select arrow, and actuator 214 and the down arrow.

Figure 8:
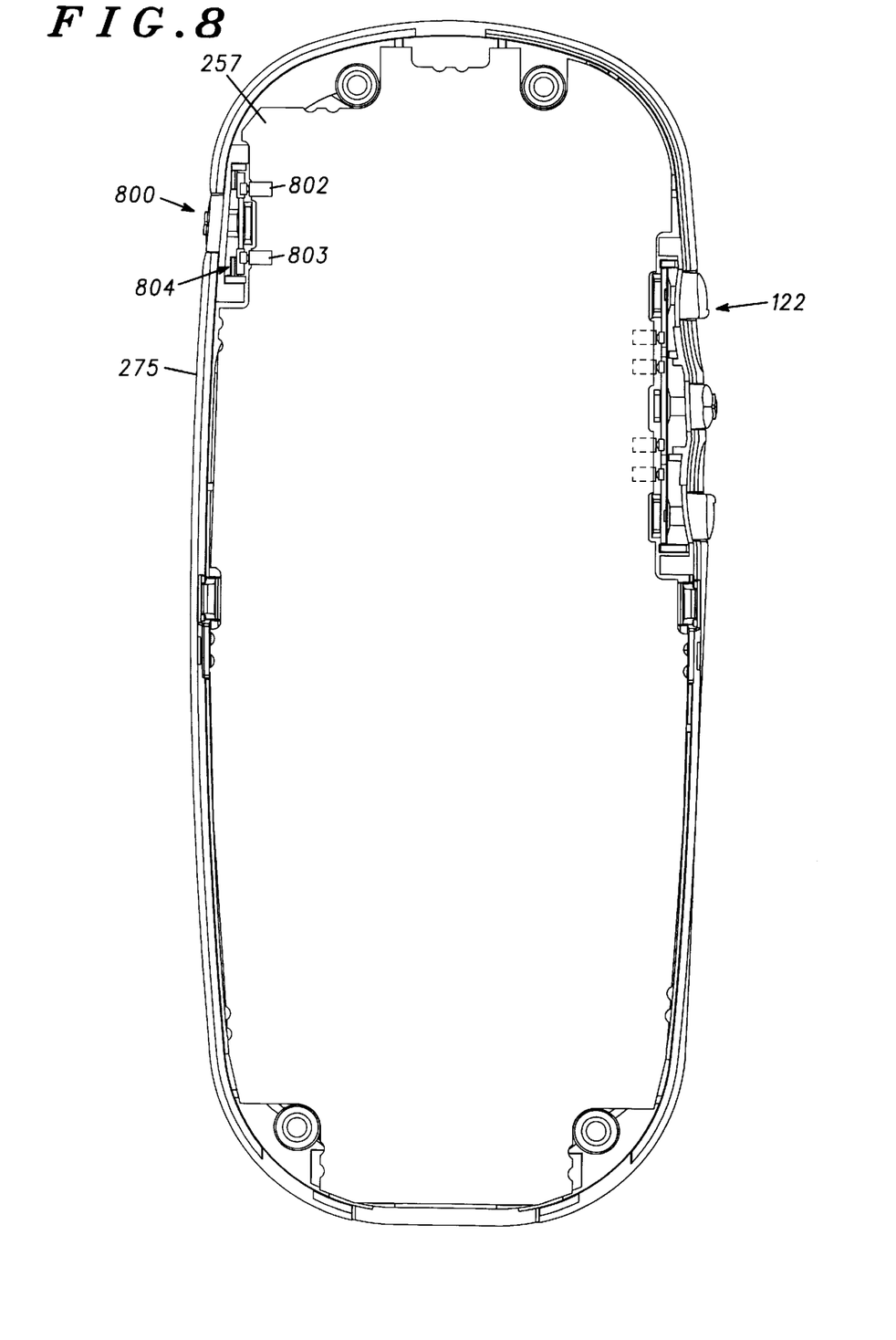
FIG. 8 is a plan view of the fragmentary portion of the electronic device, showing an alternate switch assembly assembled to the housing portion and the substrate.
Figure 9:
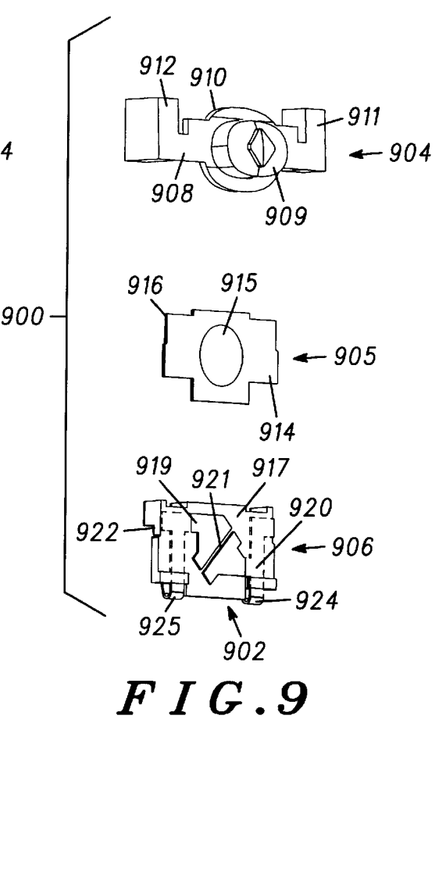
FIG. 9 is an exploded first perspective view of the alternate switch assembly of FIG. 8.
Figure 10:
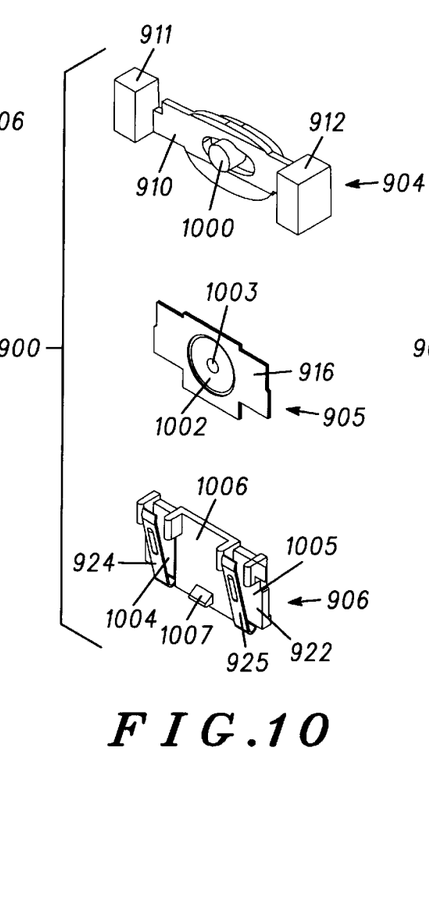
FIG. 10 is an exploded second perspective view of the alternate switch assembly of FIG. 8.

The aforementioned benefits of switch assembly 122 may also be realized in a single actuator switch assembly 800 shown in FIG. 8. Switch assembly 800 is shown assembled to the substrate 257 and front housing portion 104 adjacent to right sidewall 275 thereof. As shown in FIGS. 9 and 10, the switch assembly 800 includes a body 900 and a set of contact arms 902. The body 900 has an actuator subassembly 904, a dome subassembly 905, and a circuit panel subassembly 906 that are substantially similar in function to subassemblies 206, 208, and 210 of FIG. 2, respectively. The actuator subassembly 904 of FIG. 9 has a front face surface 908 defined by a single, central actuator 909, and a rear face surface 910 defined by left and right end grips 911 and 912 and a central plunger 1000 opposite actuator 909. The dome subassembly 905 has a front face surface 914 defined by a single, central dome 915, and a rear face surface 916 defined by a concave surface 1002, which is opposite dome 915 and contains a central conductive pad 1003. The circuit panel subassembly 906 has a front face surface 917 defined by a single circuit 918 with conductors 919 and 920 isolated by an open circuit area 921, and a rear face surface 922 defined by left and right contact areas 1004 and 1005 and a central mating area 1006, which is opposite open circuit area 921 and contains captivating rib 1007. The set of contact arms 902 includes deflectable, crowned contact arms 924 and 925 carried on the body 200 to extend along rear face surface 922 at an angle. The front housing portion 104 includes a pocket 406 of FIG. 4 for receiving the switch assembly 800 of FIG. 8. Pocket 406 is substantially similar in function to pocket 403. As shown in FIGS. 2 and 4, pocket 406 is bounded by right sidewall 275 with an aperture 225; a support rib 226 with a retention slot 227; positioning rails 296 and 297; and arms 298 and 408.

In reference to FIGS. 2, 4, and 8–10, the switch assembly 800 is assembled in a manner similar to assembly of switch assembly 122. Contact pads 802 and 803, which are similar to any one of the contact pads 250–253, are attached about a recessed area 804 of edge surface 261 of the substrate 257. Actuator subassembly 904 is fit to pocket 406 such that actuator 909 resides in aperture 225 and the grips 911 and 912 engage the positioning rails 296 and 297, respectively. Dome subassembly 905 is adhered to circuit panel subassembly 906 such that concave surface 1002 defined by dome 915 faces open circuit area 921. Circuit panel subassembly 906/dome subassembly 905 are inserted into pocket 406 between actuator subassembly 904, support rib 226, and the positioning rails 296 and 297 and slid until bottom edge of circuit panel subassembly 906 abuts arms 298 and 408 and captivating rib 1007 inserts into retention slot 227. Next, substrate 257 is lowered into the front housing portion 104 such that contact pads 802 and 803 engage and deflect contact arms 924 and 925, respectively. In operation, the switch assembly 800 functions in a manner substantially similar to switch assembly 122 as described above with respect to FIGS. 6 and 7 and, for purposes of brevity, will not be again described.

While particular embodiments have been shown and described, modifications may be made. For example, rather than carry the contact pads 250–253 or 802 and 803, edge surface 261 of the substrate 257 could alternately employ selective plating to engage the contact arms 246–249 or 924 and 925, respectively. Although shown to be incorporated into a wireless communication device such as a radiotelephone, it will be recognized that the switch assemblies 122 and 800 may also be beneficially used in pagers, laptop computers, personal digital assistants, landline telephones, cordless telephones, two-way radios, portable cassette recorders and players, and the like. It is therefore intended in the appended claims to cover all such changes and modifications which fall within the true spirit and scope of the invention.

What is claimed is:

1. An electronic device comprising:

a housing comprising a face surface, a sidewall extending from an edge of the face surface, and at least one support rib extending from the face surface, the sidewall comprised of at least one aperture, the at least one aperture aligned with the at least one support rib;

a substrate seated in the housing, the substrate comprising a top surface, a bottom surface, and an edge surface extending therebetween;

an actuator subassembly in juxtaposition with the sidewall, the actuator subassembly comprising at least one actuator and at least one plunger opposite the at least one actuator, the at least one actuator received in the at least one aperture;

a dome subassembly in juxtaposition with the actuator subassembly, the dome subassembly comprising at least one collapsible dome, the at least one collapsible dome in abutment with the at least one plunger;

a switch circuit panel subassembly positioned off of the substrate in juxtaposition with the dome subassembly, the switch circuit panel subassembly comprising at least one open circuit area, the at least one open circuit area in alignment with the at least one collapsible dome;

a set of contact pads carried on the substrate; and a set of contact arms carried on the switch circuit panel subassembly, the set of contact arms in abutment with the set of contact pads and deflected thereby so as to electrically connect the switch circuit panel subassembly to the substrate.

* * * * *